United States Patent [19]

Voroba

[11] Patent Number: 5,199,565

[45] Date of Patent: Apr. 6, 1993

[54] SMALL BATTERY DISPENSING AND REMOVAL APPARATUS

[75] Inventor: Barry Voroba, Minnetonka, Minn.

[73] Assignee: Bausch & Lomb Incorporated, Rochester, N.Y.

[21] Appl. No.: 787,027

[22] Filed: Nov. 4, 1991

[51] Int. Cl.⁵ .............................................. B65D 73/02
[52] U.S. Cl. ................................. 206/333; 221/102; 221/122; 221/133
[58] Field of Search ................... 206/333, 533; 221/69, 221/76, 97, 102, 113, 119, 121, 122, 133

[56] References Cited

U.S. PATENT DOCUMENTS

| | | | |
|---|---|---|---|
| 1,680,130 | 8/1928 | Conner | 206/533 |
| 3,279,651 | 10/1966 | Thompson | 206/533 X |
| 3,297,932 | 1/1967 | Murphy | 221/76 X |
| 3,433,351 | 3/1969 | Zaborney | |
| 3,572,282 | 3/1971 | Tump et al. | 206/533 X |
| 3,604,559 | 9/1971 | McCall et al. | 206/533 |
| 3,625,396 | 12/1971 | Phipps | |
| 3,638,830 | 2/1972 | Belokin, Jr. | 221/296 |
| 3,712,695 | 1/1973 | Kaye | |
| 3,912,998 | 10/1975 | Harris | |
| 3,995,767 | 12/1976 | Brindley et al. | |
| 4,015,708 | 4/1977 | Kelm | |
| 4,209,091 | 6/1980 | Lieberman | |
| 4,218,522 | 8/1980 | Motoyoshi | |
| 4,860,890 | 8/1989 | Cerny et al. | |
| 4,953,700 | 9/1990 | DeDino | |
| 5,033,616 | 7/1991 | Wyser | |
| 5,117,977 | 6/1992 | Voroba | 206/333 |

FOREIGN PATENT DOCUMENTS 1045650 10/1966 United Kingdom .

Primary Examiner—Bryon P. Gehman
Attorney, Agent, or Firm—James B. Bieber

[57] ABSTRACT

A novel way to package and dispense small batteries which provides easy installation and removal of batteries from small electronic devices is described. More particularly, the invention relates to a battery dispensing and removal apparatus for simple inserting and removing of batteries from hearing aids. The battery dispensing and removal apparatus is reusable and stores used batteries for recycling or disposal.

15 Claims, 9 Drawing Sheets

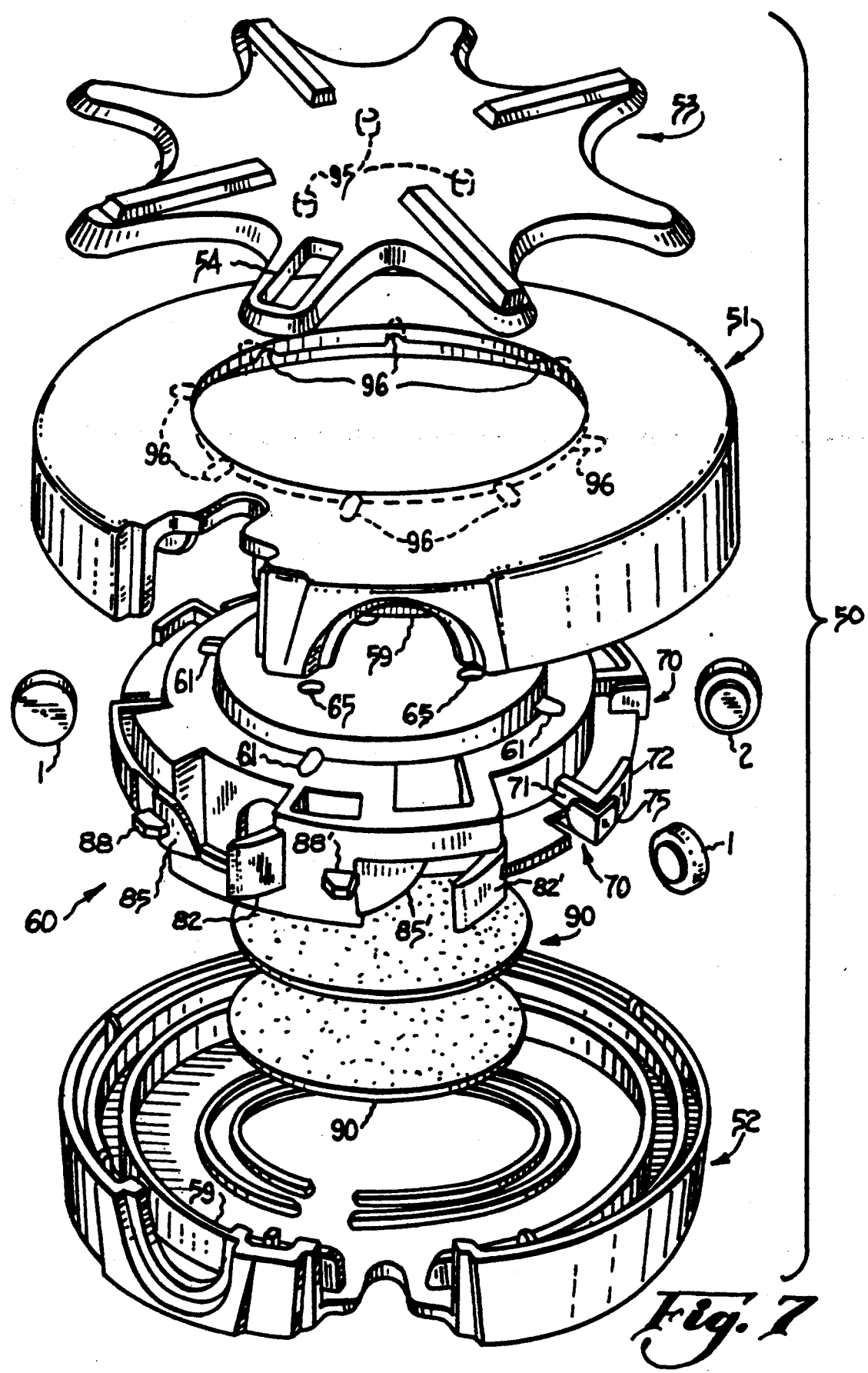

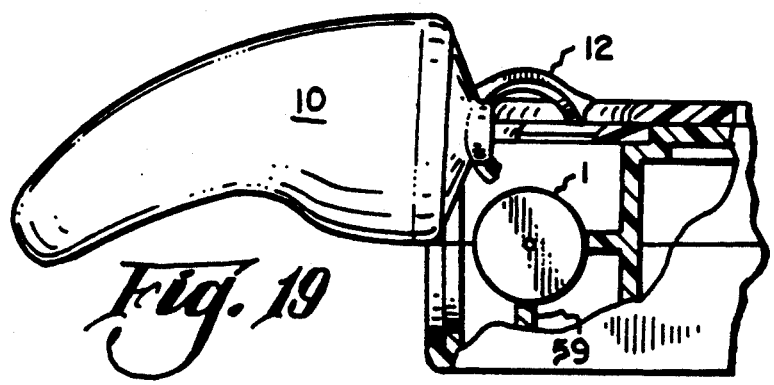
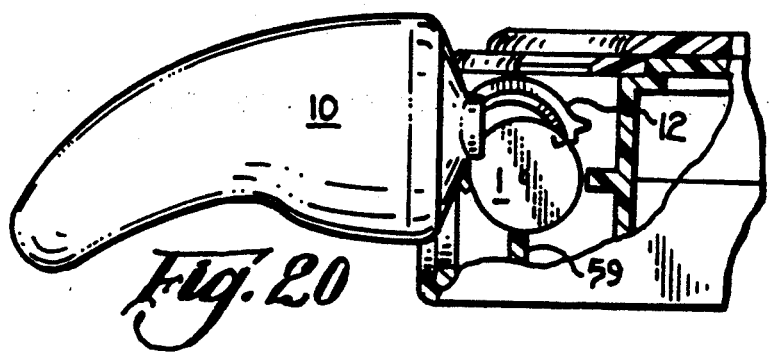
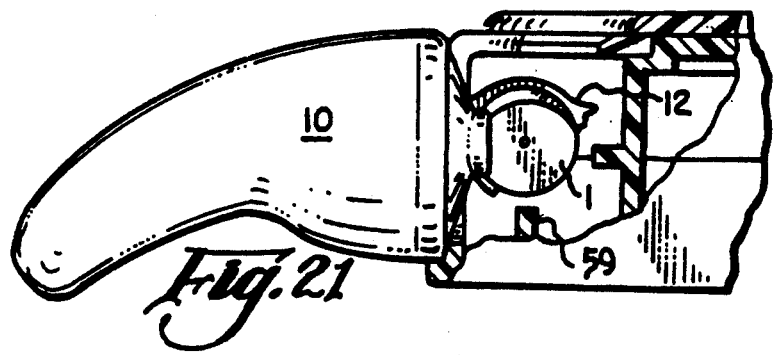
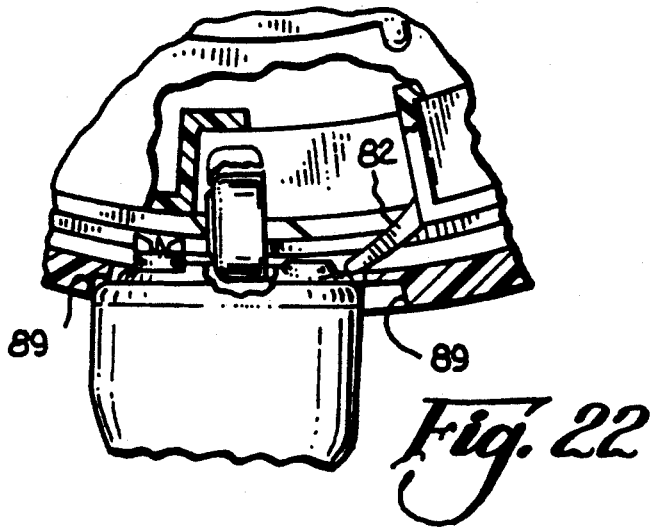

SMALL BATTERY DISPENSING AND REMOVAL APPARATUS

BACKGROUND OF THE INVENTION

This invention pertains to an apparatus for packaging and dispensing, as well as inserting and removing small batteries from their host device. More particularly, this invention pertains to a hearing aid battery dispensing and removal apparatus that allows for easy installation and ejection of batteries from hearing aids.

Battery technology has improved to allow batteries to become progressively smaller. These small batteries are incorporated in many small electronic devices that are used daily by the consuming public. The most prevalent uses for small batteries are for electronic watches, cameras and hearing aids. These small batteries are packaged in a variety of multi-pack containers which allow individual dispensing of the small batteries.

Unfortunately, an outgrowth of these developments is that batteries have decreased in size to the point where they can no longer be physically handled by many people. These batteries are smaller than most human fingers can reasonably manipulate. In fact, many batteries are smaller than the size of a human finger tip. In addition, as batteries become smaller and more customized to the small electronic devices which they power, suitable packaging and dispensing of the batteries has become increasingly difficult. Furthermore, there are frequently adhesive tabs, even smaller than the batteries, that must be removed to activate some types of batteries. And the polarity of the battery may have to be determined prior to loading into the small electronic devices.

These advances in battery technology have created a major problem for users of hearing aids. Human hearing generally deteriorates with age. Therefore, hearing aids are more common with older generations. Many individuals within these older generations have lost their manual dexterity with age, their hands begin to shake and joints are not as flexible as they used to be. Also, individuals in this age group prefer simple things that are easy to use.

Hearing impaired individuals with dexterity and/or vision problems typically have great difficulty inserting and removing small batteries from the hearing aids. Presently, many of these hearing impaired consumers must seek the aid of a professional or a younger person to simply install and remove batteries from their hearing aids. As the life expectancy and average age in our society continues to increase, there is a greater need for hearing aids. This means that a larger number of hearing impaired individuals will require assistance with hearing aid batteries unless an easier and simpler means of inserting and removing small batteries from hearing aids is provided.

Our society also continues to become more environmentally aware and is stressing conservation and recycling to help keep the environment clean. Present battery technology does not make it economically feasible to recharge smaller batteries. Due to the contents of these batteries, discarding batteries in dump sites may pose threats to our environment. In addition, discarding of packaging such as paper, cardboard, plastics and styrofoam for consumer goods has become a major contributor to our environmental problems. Thus, these small batteries and their packaging must be properly disposed. This is only possible if they are easily collected after use. In the future, it may become economically feasible and perhaps necessary under law to recycle batteries and their packaging. This would also require these small batteries and their packaging to be easily collected after use.

It would be desirable to provide a packaging device which allows small batteries to be simply dispensed for use in small electronic devices.

It would also be desirable to provide a packaging device which allows for simple insertion of batteries into small electronic devices It would be further desirable to provide a single packaging device which removes spent batteries from small electronic devices and dispenses new batteries for insertion into small electronic devices.

It would be still further desirable to provide recyclable packaging for small batteries.

It would also be further desirable to provide a packaging device which provides easy storage of spent batteries for proper disposal or recycling.

SUMMARY OF THE INVENTION

It is therefore an object of this invention to provide a packaging device which allows small batteries to be simply dispensed for use in small electronic devices.

It is another object of this invention to provide a packaging device which allows for simple insertion of batteries into small electronic devices.

It is a further object of this invention to provide a single packaging device which removes spent batteries from small electronic devices and dispenses new batteries for insertion into small electronic devices.

It is yet another object of this invention to provide recyclable packaging for small batteries.

It is still another object of this invention to provide a packaging device which provides easy storage of spent batteries for proper disposal or recycling.

In accordance with this invention, there is provided a small battery dispensing and removal apparatus that facilitates insertion and removal of small batteries from small electronic devices. This is a particularly useful invention for individuals with hearing aids who have great difficulty handling small batteries.

The small battery dispensing and removal apparatus of this invention is formed with a central core that is rotatably secured in a housing. The central core has a plurality of battery dispensing stations located around its periphery. Each battery dispensing station facilitates the insertion of batteries in hearing aids. In addition, the central core has a least one battery removal station located on its periphery. The battery removal station facilitates the ejection of spent batteries from the hearing aid. The ejected battery may be either expelled from the battery dispensing and removal apparatus through one or more openings located therein or may be stored therein for subsequent removal. Preferably, the central core is designed so that it can be used for both a right hearing aid and a left hearing aid.

To use the battery dispensing and removal apparatus, the individual simply rotates the central core to reveal a battery dispensing station in an opening in the housing. The individual places the battery chamber of the hearing aid over the battery in the battery dispensing station and, with a downward motion of the hearing aid, forces the battery from the battery dispensing station into the battery chamber of the hearing aid. To remove the battery from the hearing aid, the individual again rotates the central core to reveal a battery removal station in an opening in the housing. The individual places the battery in the battery chamber of the hearing aid against a sloped removal edge of the battery removal station and, with a downward motion, ejects the battery. The advantage of this battery dispensing and removal apparatus is that little manual dexterity is needed. The battery dispensing and removal apparatus is extremely easy and simple to use and will be a great aid to those who are unable to handle the small batteries used in hearing aids.

Some of the small batteries used in small electronic devices are oxygen activated. These oxygen activated batteries corrode and discharge with long exposure to air. To solve this problem, most small oxygen activated batteries are marketed to the consumer with tabs covering a portion of the battery. These tabs must be removed prior to use. However, these tiny tabs are difficult to remove from the battery. With the present invention no tabs are needed. The battery dispensing station can have a rubber or silicone backed tape located therein to assist in holding the battery in place and to protect the battery from exposure to oxygen.

In the future, it may become economically feasible to recharge these small batteries after use. With this invention, the small batteries, as well as the packaging container itself, can be recycled. Since the spent batteries may be placed in a storage area within the battery dispensing and removal apparatus, the entire package can be simply returned to the battery supplier. The battery supplier can then remove the spent batteries from within the battery dispensing and removal apparatus and reload the internal core with fresh batteries. The removed batteries can then be either recycled or properly disposed.

BRIEF DESCRIPTION OF THE DRAWINGS

These and other objects and advantages of the invention will become apparent upon review of the following detailed description, taken in conjunction with the accompanying drawings, in which like reference characters refer to like parts throughout, and in which:.

FIG. 7 is an exploded perspective view of the battery dispensing and removal apparatus of this invention;

FIGS. 19 through 21 are side elevation views of a hearing aid and a portion of the battery dispensing and removal apparatus of this invention with a portion cut away showing how the battery is inserted into the battery chamber of a hearing aid; and FIG. 22 is a partial top plan view of the battery dispensing and removal apparatus of this invention with a portion cut away showing the interrelationship of a micro type of hearing aid in one of the battery removal stations.

DETAILED DESCRIPTION OF THE INVENTION

Figure 1:
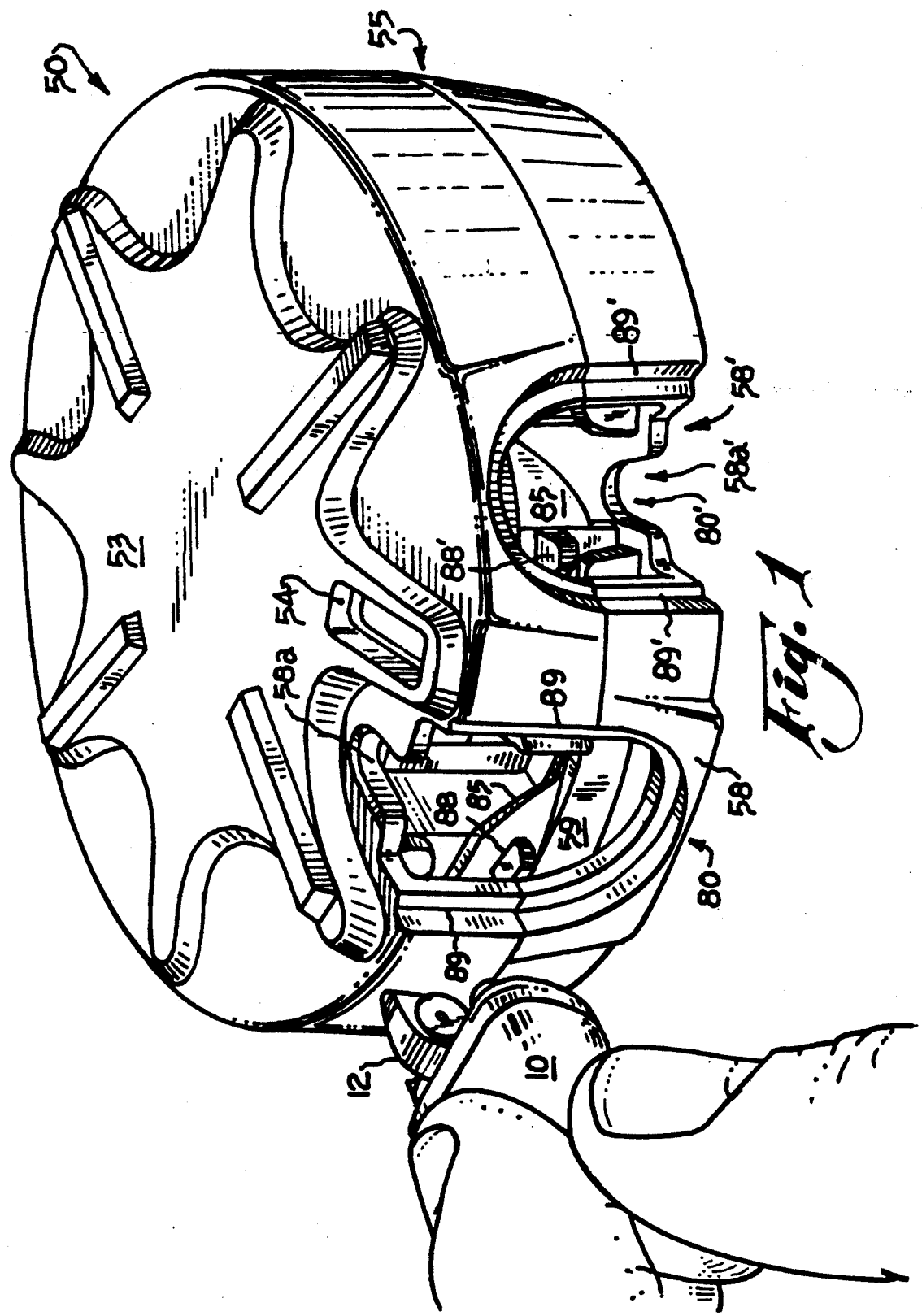
FIG. 1 is a perspective view of the battery dispensing and removal apparatus of this invention with a battery removal station in communication with the housing opening and a hearing aid manufactured for the left ear of a patient with an open battery compartment prior to removal of the battery therefrom.
Figure 2:
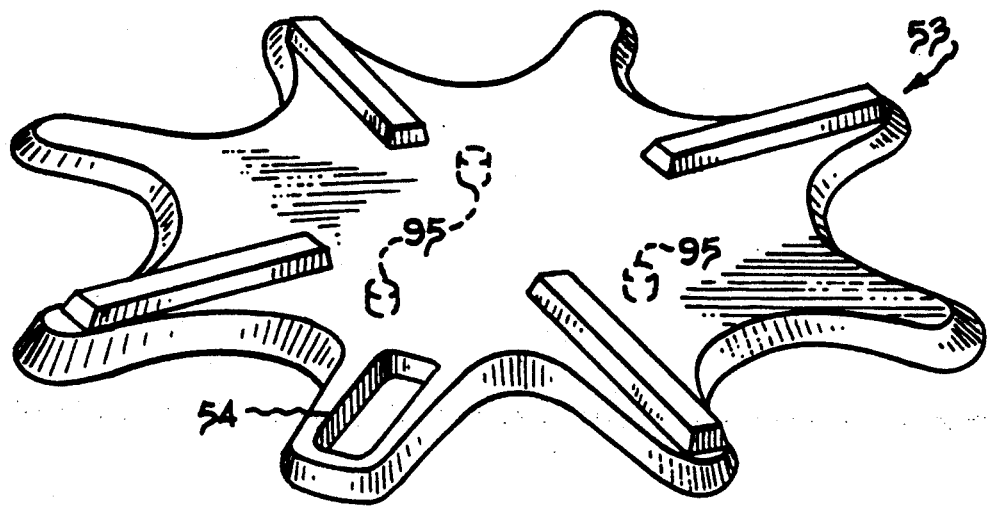
FIG. 2 is a perspective view of the rotation wheel for the battery dispensing and removal apparatus of this invention.
Figure 3:
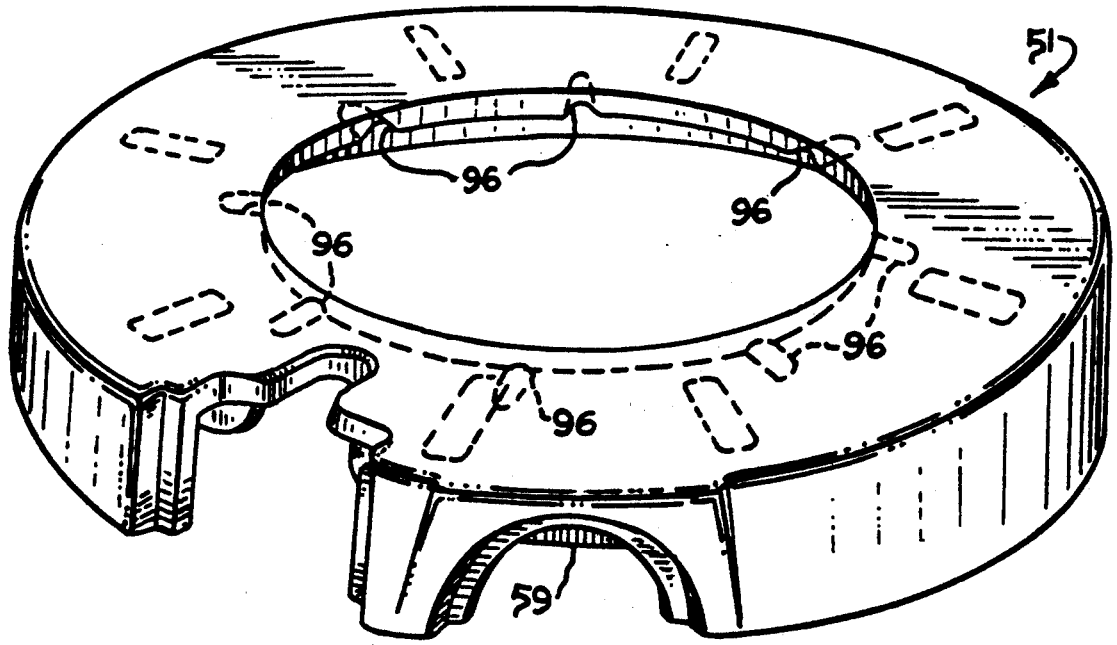
FIG. 3 is a perspective view of the cover for the battery dispensing and removal apparatus of this invention.
Figure 4:
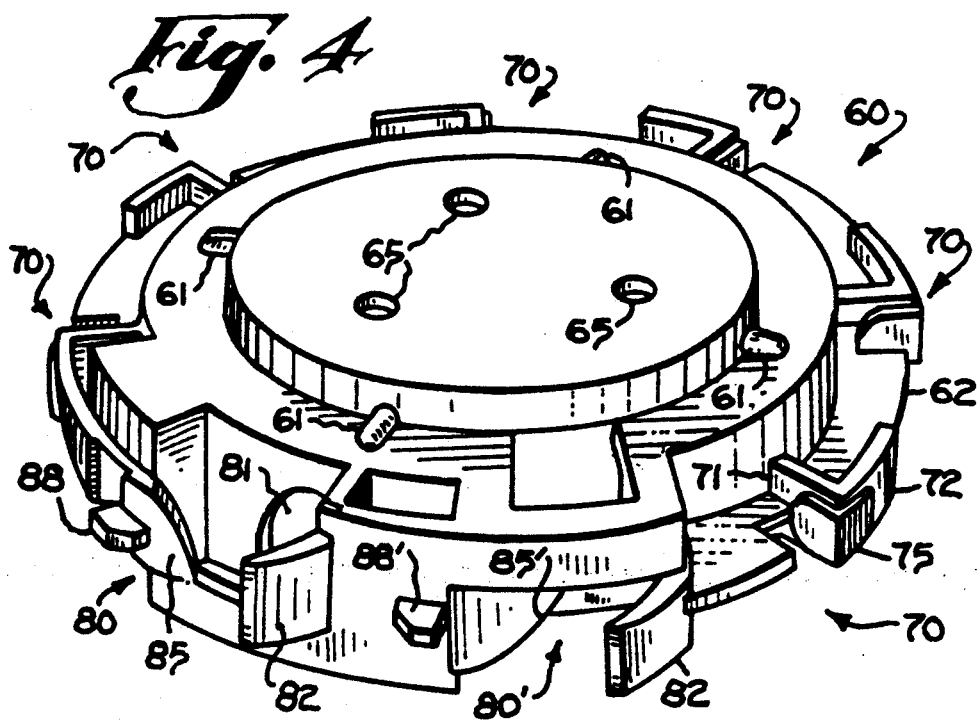
FIG. 4 is a perspective view of the central core for the battery dispensing and removal apparatus of this invention.
Figure 6:
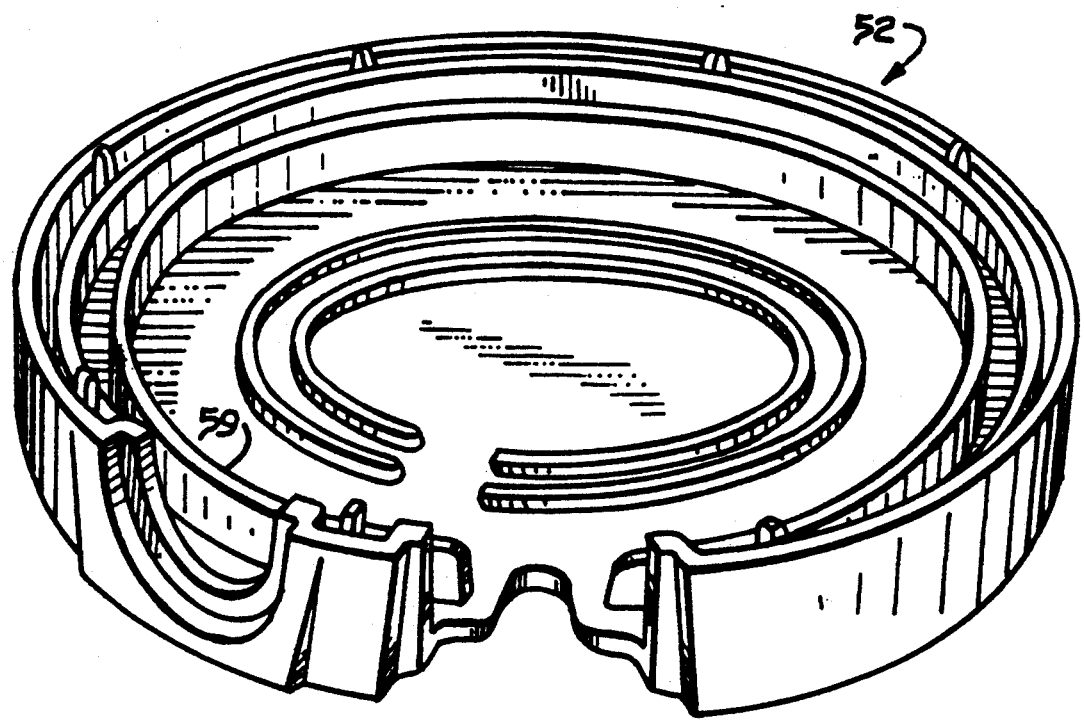
FIG. 6 is a perspective view of the base for the battery dispensing and removal apparatus of this invention.
Figure 5:
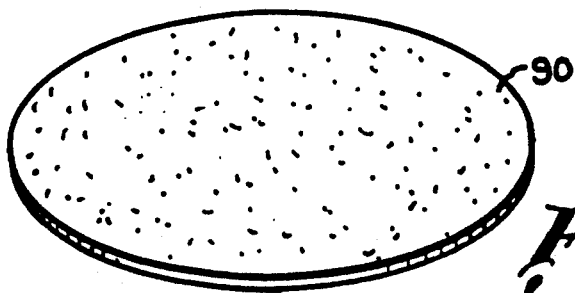
FIG. 5 is a perspective view of a double sided tape that is used to retain spent batteries in the battery dispensing and removal apparatus of this invention.
Figure 8:
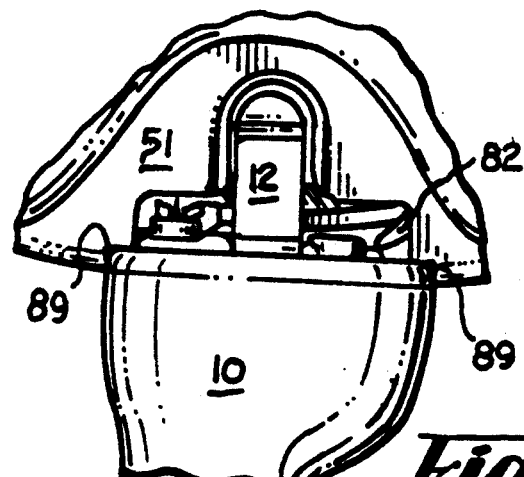
FIG. 8 is a partial top plan view showing the interrelationship of the hearing aid in the housing opening of the battery dispensing and removal apparatus of this invention.
Figure 12:
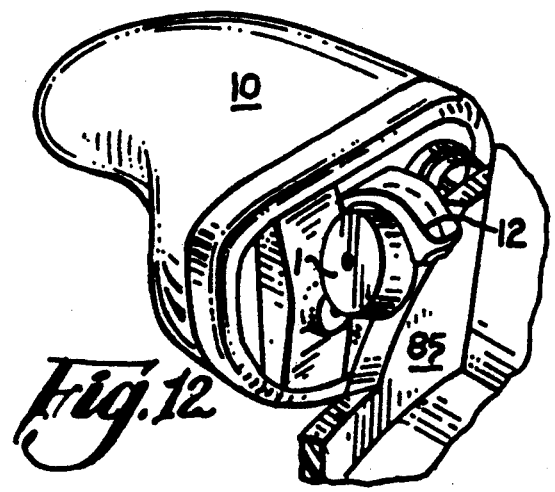
FIG. 12 is a perspective view of a hearing aid and a portion of the battery dispensing and removal apparatus of this invention showing how the removal edge dislodges the battery from the hearing aid.
Figure 13:
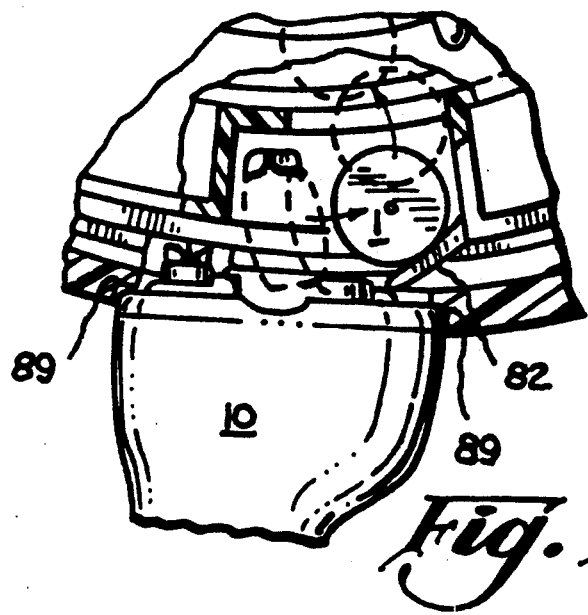
FIG. 13 is a view similar to the view of FIG. 9 showing the path of the battery from the hearing aid at the battery removal station to the inside of the central core of the battery dispensing and removal apparatus of this invention.
Figure 9:
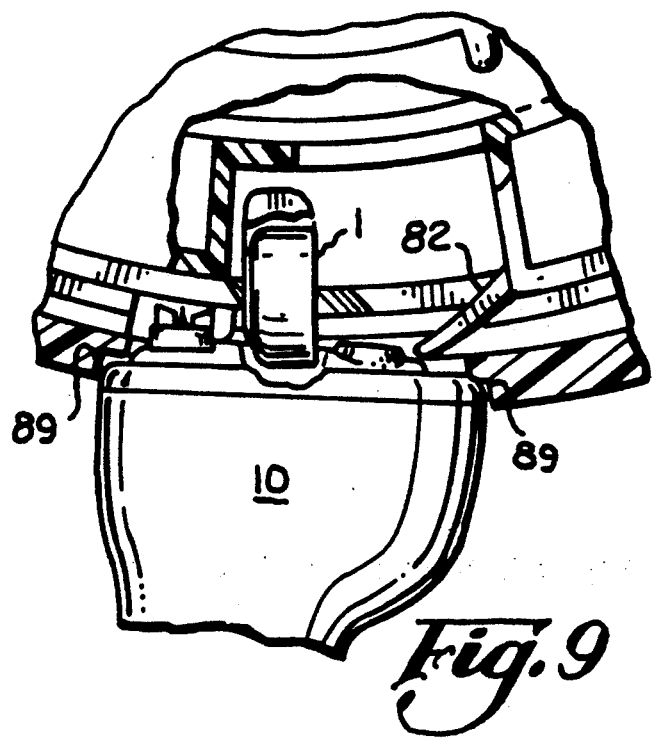
FIG. 9 is a view similar to the view of FIG. 8 with a portion cut away to show the battery prior to removal from the hearing aid.
Figure 10:
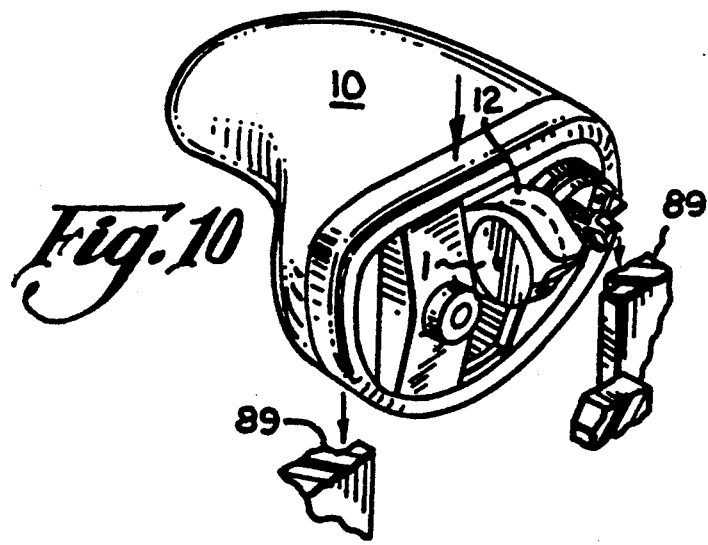
FIG. 10 is an exploded perspective view of a hearing aid and a portion of the battery dispensing and removal apparatus of this invention showing how the hearing aid is guided into proper postion in the battery removal station for removal of the battery from the hearing aid.
Figure 11:
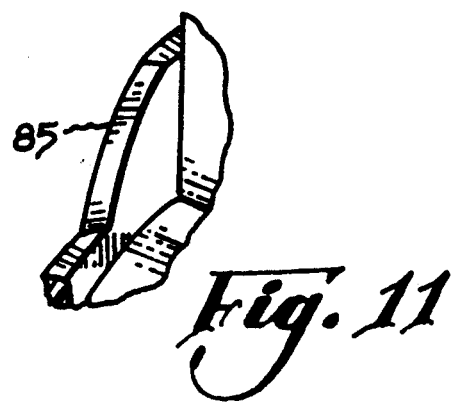
FIG. 11 is a partial perspective view of the battery dispensing and removal apparatus of this invention showing the removal edge of the battery removal station.
Figure 14:
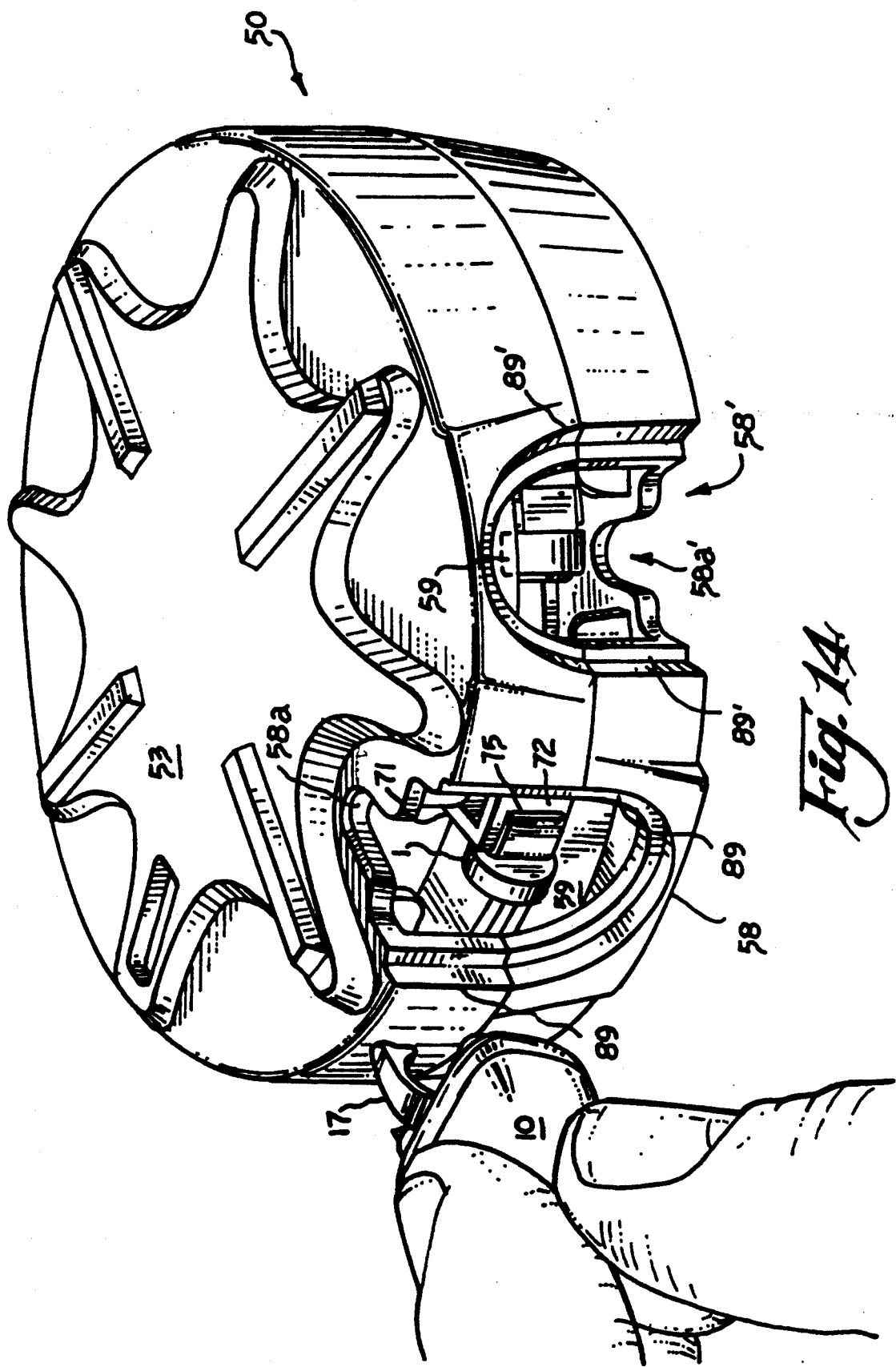
FIG. 14 is a perspective view of the battery dispensing and removal apparatus of this invention with a battery dispensing station in communication with the housing opening and a hearing aid designed for the left ear of a patient with the battery compartment open prior to insertion of the battery in the hearing aid.
Figure 15:
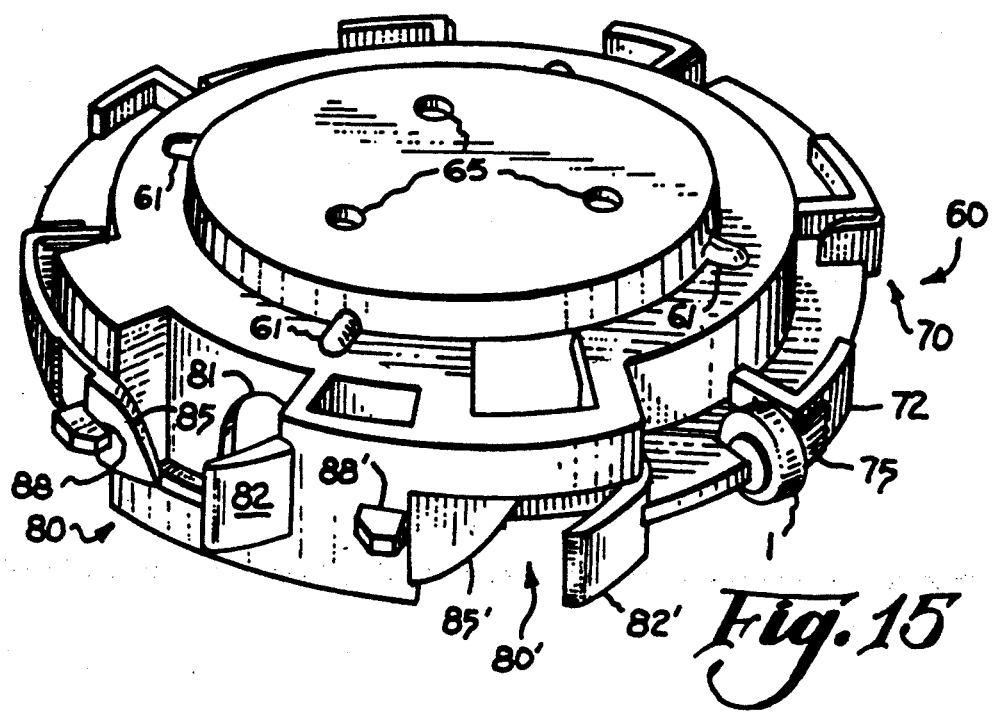
FIG. 15 is a perspective view of the central core of the battery dispensing and removal apparatus of this invention showing a battery held in place in one of the battery dispensing stations.
Figure 16:
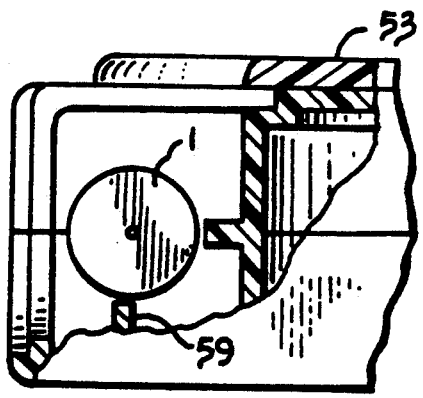
FIG. 16 is a partial cut away side elevation view of the battery dispensing and removal apparatus of this invention showing the orientation of a battery in one of the battery dispensing stations.
Figure 17:
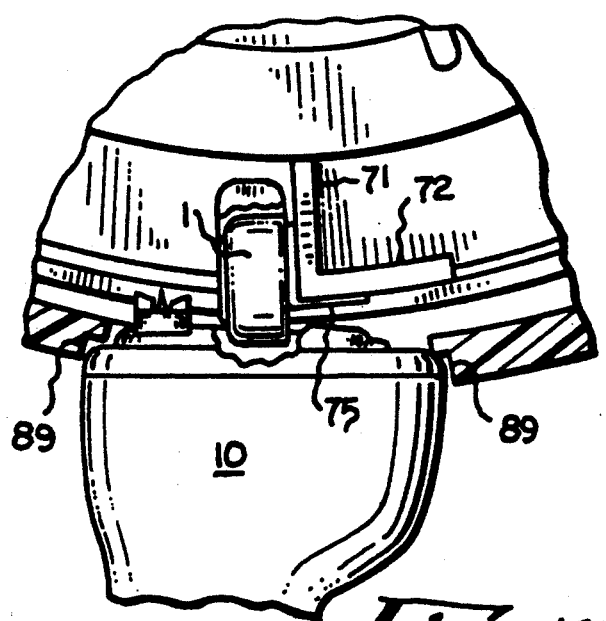
FIG. 17 is a partial top plan view of the battery dispensing and removal apparatus of this invention with a portion cut away showing the interrelationship of the hearing aid and a battery in one of the battery dispensing stations.

A left hearing aid 10 is shown in FIG. 1 with the battery compartment 12 open prior to insertion into the left hearing aid battery removal station 80 of the battery dispensing and removal apparatus 50. The battery 1 is retained in battery compartment 12. Battery compartment 12 is pivotally mounted in the face of hearing aid 10. Battery 1 must be pushed and rolled away from battery compartment 12 to be removed. Where hearing aid 10 is in the orientation shown in FIG. 1, battery 1 may be removed if pushed left for right hearing aids or pushed right for left hearing aids.

Battery dispensing and removal apparatus 50 requires little dexterity and coordination and provides easy insertion and removal of batteries 1 from small electronic devices such as hearing aid 10. Battery dispensing and removal apparatus 50 comprises a central core 60 which is rotatably secured inside of a housing 55. Housing 55 may be formed from a separate cover 51 and a separate base 52 or it may be formed from one piece. A rotation wheel 53 extends through an opening in cover 51 and is connected to central core 60 to allow the user to rotate central core 60. Rotation wheel 53 can be of any configuration but preferably has a star wheel configuration. Central core 60 is designed to facilitate insertion and removal of batteries from right and left hearing aids.

Central core 60 comprises a main body portion 61 and a skirt portion 62. Central core 60 defines a plurality of battery dispensing stations 70 located around the periphery of central core 60. These battery dispensing stations 70 have the same configuration and are formed in skirt portion 62 which extends away from main body portion 61 of central core 60. Any number of battery dispensing stations 70 can be used. However, preferably six battery dispensing stations 70 are located around the periphery of central core 60.

Preferably skirt portion 62 is cut away at each battery dispensing station 70 to define a fork-like open space in which a small battery may be located. One side of this space is defined by a vertical side wall 71. In addition, a forward wall 72 extends from vertical side wall 71 away from the fork-like open space at the outermost portion of skirt 62. Preferably a battery holding pad 75, which can be made from a rubberoid or silicone backed tape, is affixed to vertical side wall 71 and extends around to forward wall 72. Battery holding pad 75 provides the tension necessary to hold the battery in place. In addition, battery holding pad 75 provides a cover for any openings in oxygen sensitive batteries such as a zinc air battery.

In order to load battery 1 in hearing aid 10, one battery dispensing station is rotated into communication with opening 58 for left hearing aids. Battery compartment 12 is positioned over battery 1 held in one of the battery dispensing stations 70. With a downward motion, battery compartment 12 is guided over battery 1 forcing battery 1 into battery compartment 12 thus installing battery 1 in hearing aid 10. See FIGS. 19 through 21. Battery support rails 59 are located in housing 55 to hold battery 1 in its upright vertical position in battery dispensing station 70. This allows battery compartment 12 of hearing aid 10 to snap over battery 1 before battery 1 is dislodged from battery dispensing station 70. Preferably battery support rails 59 are located in both cover 51 and base 52 so that battery dispensing and removal apparatus 50 can be flipped over for use with right hearing aids via opening 58'.

When all of the batteries in each battery dispensing station 70 have been dispensed, the consumer can return battery dispensing and removal apparatus 50 to be refurbished. New batteries can be placed in each battery dispensing station 70 and may then be returned to the consumer as serviced or resold.

Figure 18:
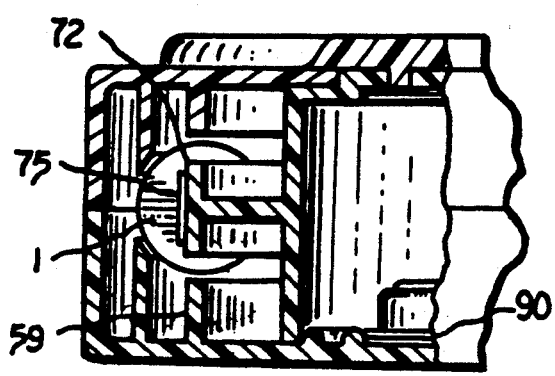
FIG. 18 is a partial side elevation view of the battery dispensing and removal apparatus of this invention with a portion cut away showing a battery held in place in one of the battery dispensing stations.

Central core 60 also has at least one, and preferably two, battery removal stations. One is a left hearing aid battery removal station 80 and the other is a right hearing aid battery removal station 80'. Each battery removal station comprises an aperture in main body portion 61 of central core 60. These apertures are disposed in the side of main body portion 61 of central core 60 and are in communication with the inside of central core 61 to allow spent batteries removed from the hearing aid to be stored therein. A double sided tape 90 or other sticky substance which functions to retain batteries in base 52 may be fixed to base 52 to capture the spent batteries. See FIG. 18. Double sided tape 90 holds the spent batteries to prevent them from rolling around inside of central core 60 until battery dispensing and removal apparatus 50 is returned to a battery dealer who can remove the spent batteries. Baffles or other structures may be added to base 52 to safely store the spent batteries and prevent them from rolling or falling out of base 52.

Alternatively, an opening (not shown) in either or both sides of housing 55 may be provided to allow the spent batteries to be discharged from battery dispensing and removal apparatus 50.

Removal edge 85 is used in conjunction with aperture 81 to remove batteries from left hearing aids. Removal edge 85 is sloped to urge battery 1 out of battery compartment 12 when hearing aid 10 is moved downwardly through battery removal station 80. Removal edge 85 slopes downwardly to the right for left hearing aids. A guide plate 82 adjacent to sloped edge 85 directs the battery toward aperture 81. The batteries thus removed from hearing aid 1 fall through aperture 81 and into central core 60 where they are stored on double sided tape 90 for subsequent removal or are expelled from battery dispensing and removal apparatus 50.

When battery dispensing and removal apparatus 50 is flipped over, battery removal station 80' can be used to remove batteries from right hearing aids. In battery removal station 80' when battery dispensing and removal apparatus 50 is flipped over, removal edge 85' slopes downwardly to the left. Guide plate 82' guides batteries into the aperature (not shown) used with battery removal station 80'.

In order to remove a battery from a hearing aid, core 60 is rotated to put battery removal station 80 or 80' into communication with opening 58 or 58'. Left hearing aid 10 is positioned over left hearing aid battery removal station 80 with battery compartment 12 opened and battery 1 exposed. A pair of indentations 89 formed in cover 51 act as a guide for hearing aid 10 as it is moved downwardly to effect removal of battery 1 from hearing aid 10. When micro type hearing aids are used, the right indentation 89 of opening 58, as seen in FIG. 1, should have a wider surface area extending to the left to guide that type of hearing aid in its downward motion. See FIG. 22.

The downward motion of hearing aid 10 causes battery 1 to come into contact with removal edge 85 which pushes battery 1 to the right out of battery compartment 12. Preferably a ledge 88 is formed adjacent to removal edge 85. Ledge 88 prevents hearing aid 10 from being moved downwardly past removal edge 85 to a point that would tear battery compartment 12 off of the face of hearing aid 10. Ledge 88 also guides hearing aid 10 preventing it from rotating so that battery 1 maintains alignment with removal edge 85.

When battery dispensing and removal apparatus 50 is flipped over and battery removal station 80' is used, indentations 89' guide the downward movement of the right hearing aid. For micro type hearing aids, right indentation 89', as seen in FIG. 1, should have a wider surface area extending to the left to guide that type of hearing aid in its downward motion. Ledge 88' prevents the battery compartment from being torn off of the face of the right hearing aid. Ledge 88' also guides the right hearing aid preventing it from rotating so that the battery maintains alignment with removal edge 85'.

Housing 55 defines at least one, and preferably two, openings 58 and 58' which allow access to battery dispensing stations 70 and battery removal stations 80 and 80' of central core 60. Opening 58 is designed for a left hearing aid while opening 58' is designed for a right hearing aid. Separate openings for right and left hearing aids are needed to ensure that the battery polarity is properly oriented inside left and right hearing aids and to accommodate the different orientations of the battery compartments for the left and right hearing aids.

Openings 58 and 58' extend along the top or bottom of housing 55 to allow the battery compartment 12 of left or right hearing aids to extend over the top of battery 1 located in battery dispensing station 70. Openings 58 and 58' must also allow the battery compartment of left or right hearing aids to extend over removal edge 85 or 85' of battery removal station 80 or 80'. Preferably, openings 58 and 58' have U-shaped extensions 58a and 58a' each of which accommodates the battery compartment and properly aligns the hearing aids in openings 58 and 58' for battery insertion and removal.

In order to allow for easy packing of batteries in battery dispensing and removal apparatus 50, preferably all of the batteries are oriented in the same manner in each of battery dispensing stations 70. By flipping over battery dispensing and removal apparatus 50 and using opening 58' for right hearing aids and opening 58 for left hearing aids, the polarity of the battery will be properly aligned in right and left hearing aids. In addition, as discussed above, by orienting one battery removal station 80 so that sloped edge 85 is adjacent to the bottom left of aperture 81 and orienting another battery removal station 80' so that sloped edge 85' is adjacent to the bottom right of aperture 81' when battery dispensing and removal apparatus 50 is flipped over, battery removal station 80 can be used for a left hearing aid and, when battery dispensing and removal apparatus 50 is flipped over, battery removal station 80' can be used for a right hearing aid.

Those skilled in the art will realize that, if both right and left hearing aids are similarly structured, there would be no need for two separate openings in the housing nor would there be a need for two separate battery removal stations.

Rotation wheel 53 is operably connected to central core 60 to move central core 60 so that either a battery dispensing station 70 or battery removal station 80 or 80' is exposed in opening 58 or 58'. Preferably depending pegs 95 on rotation 53 are secured in pegholes 65 located in central core 60. A detent mechanism may be used to ensure that central core 60 remains properly aligned when the desired battery dispensing or battery removal station is rotated to be in communication with opening 58 or 58'. This detent mechanism preferably comprises ribs 61 located on central core 60 and detent depressions 96 located on cover 51.

Rotation wheel 53 can be formed with an opening 54. Opening 54 can be used in combination with appropriate labeling on cover 51 to aid the user in choosing the appropriate battery dispensing station 70 or battery removal station 80 or 80'. Thus when rotation wheel 53 rotates central core 60, an indication is provided through opening 54 of whether battery dispensing station 70 or battery removal station 80 or 80' is in communication with opening 58 or 58'.

As shown and described, this invention is a multi-battery dispenser which easily dispenses, installs and removes batteries from hearing aids. It is reusable and can store the removed batteries for proper disposal or recycling. The invention contains both dispensing and removal stations for hearing aids in a single package. The dispensing and removal stations are self-guiding and are simple to use.

The terms and descriptions used herein are set forth by way of illustration only and are not meant as limitations. This invention is limited only by the claims which follow.

What is claimed is:

1. A battery dispenser comprising:
    a core having a main body portion and a skirt portion, said main body portion defining a space interior of said main body portion;
    at least one battery dispensing means formed along said skirt portion for holding a battery in a vertical position for direct insertion into an electronic device;
    at least one battery removal means formed adjacent to said main body portion for directly removing a battery from an electronic device;
    a housing having at least one portal formed therein and means for rotatably securing said core within said housing wherein rotating said core positions each of said dispensing means and said removal means into communication with said at least one portal such that a battery is insertable or removable directly by an electronic device; and
    battery support means adjacent to said at least one battery dispensing means when said battery dispensing means is in communication with said at least one portal for maintaining a battery held in said dispensing means in said vertical position for insertion into an electronic device.

2. The battery dispenser of claim 1 further comprising a means associated with said battery dispensing means for preventing air contact with a portion of a battery held in said battery dispensing means.

3. The battery dispenser of either of claims 1 or 2 wherein said battery removal means comprises:
    an opening formed in said main body portion of said core which is in communication with said space interior of said main body portion; and
    a removal edge adjacent to said opening for urging a battery from an electronic device through said opening.

4. The battery dispenser of claim 3 further comprising cooperating detent means associated with said housing and said core for aligning said at least one portal with each of said battery dispensing means and said battery removal means.

5. The battery dispenser of claim 3 further comprising a rotation wheel connected to said core for rotating said core, within said housing.

6. The battery dispenser of any one of claims 1, 2 or 5 further comprising cooperating detent means associated with said housing and said core for aligning said at least one portal with each of said battery dispensing means and said battery removal means.

7. The battery dispenser of either of claims 1 or 2 further comprising a rotation wheel operably connected to said core for rotating said core within said housing.

8. The battery dispenser of claim 7 further comprising cooperating detent means associated with said housing and said core for aligning said at least one portal with each of said battery dispensing means and said battery removal means.

9. A battery dispenser comprising:
- a core having a main body portion and a skirt portion, said main body portion defining a space interior of said main body portion;
- at least one battery dispensing means formed along said skirt portion for holding a battery in a vertical position for insertion into a small electronic device, said battery dispensing means being defined by a notch formed in said skirt portion and a vertical wall extending out from said notch along one side thereof and further comprising a means adjacent to said vertical wall for providing tension to hold a battery in said battery dispensing means;
- at least one battery removal means formed adjacent to said main body portion for removing a battery from a small electronic device comprising an opening formed in said main body portion of said core which is in communication with said space interior of said main body portion;
- a removal edge adjacent to said opening for dislodging a battery from a small electronic device through said opening and into said space interior of said main body portion;
- a housing having at least one portal formed therein and means for rotatably securing said core within said housing wherein rotating said core positions each of said dispensing means and said removal means into communication with said at least one portal such that a battery is insertable or removable directly by an electronic device; and
- battery support means in said housing adjacent to said at least one portal for maintaining a battery held in said battery dispensing means in a vertical position for insertion into a small electronic device.

10. The battery dispenser of claim 9 further comprising means associated with said battery dispensing means for preventing air contact with portions of a battery held in said battery dispensing means.

11. The battery dispenser of claim 10 further comprising a rotation wheel operably connected to said core for rotating said core within said housing.

12. The battery dispenser of claim 9 further comprising cooperating detent means associated with said core and said housing for aligning said at least one portal with each of said battery dispensing means and said battery removal means.

13. The battery dispenser of either of claims 9 or 12 further comprising a rotation wheel operably connected to said core for rotating said core within said housing.

14. The battery dispenser of claim 13 further comprising a means for retaining batteries within said space interior of said main body portion.

15. The battery dispenser of either of claims 9 or 12 further comprising a means for retaining batteries within said space interior of said main body portion.

* * * * *

UNITED STATES PATENT AND TRADEMARK OFFICE
CERTIFICATE OF CORRECTION

PATENT NO. : 5,199,565
DATED : April 6, 1993
INVENTOR(S) : Barry Voroba

It is certified that error appears in the above-identified patent and that said Letters Patent is hereby corrected as shown below:

Column 6, line 26, delete "1" and insert --10-- in its place.

Signed and Sealed this

Seventh Day of June, 1994

Attest:

BRUCE LEHMAN

Attesting Officer

Commissioner of Patents and Trademarks